United States Patent [19]
Yoneyama et al.

[11] Patent Number: 5,227,889
[45] Date of Patent: Jul. 13, 1993

[54] IMAGE SLANT COMPENSATABLE VIDEO CAMERA

[75] Inventors: Masayuki Yoneyama, Takatsuki; Ryuichiro Kuga, Ikoma, both of Japan

[73] Assignee: Matsushita Electric Industrial Co., Ltd., Osaka, Japan

[21] Appl. No.: 695,341

[22] Filed: May 6, 1991

[30] Foreign Application Priority Data

May 11, 1990 [JP] Japan ................... 2-121626

[51] Int. Cl.$^5$ ..................... H04N 5/228; H04N 5/30
[52] U.S. Cl. ................................ 358/222; 358/209
[58] Field of Search ............... 356/222, 125, 126, 209; 359/554; 382/46

[56] References Cited

U.S. PATENT DOCUMENTS

| | | | |
|---|---|---|---|
| 4,680,630 | 7/1987 | Field | 382/46 |
| 4,709,264 | 11/1987 | Tamura et al. | 358/222 |
| 4,959,725 | 9/1990 | Mandle | 358/222 |
| 5,012,347 | 4/1991 | Fournier | 358/222 |
| 5,062,696 | 11/1991 | Oshima et al. | 358/222 |

FOREIGN PATENT DOCUMENTS

| | | |
|---|---|---|
| 58-92169 | 6/1983 | Japan . |
| 58-222382 | 12/1983 | Japan . |
| 1-170279 | 7/1989 | Japan . |
| 2-226372 | 9/1990 | Japan . |

OTHER PUBLICATIONS

"The Electronic Picture Stabilizer", IIEJ Technical Report, vol. II. No. 3, PPOE, '87, May 2, 1987.

Primary Examiner—Michael T. Razavi
Assistant Examiner—Wendy R. Greening
Attorney, Agent, or Firm—Wenderoth, Lind & Ponack

[57] ABSTRACT

The amount of slant of an entire video camera in the vertical direction is detected by a slant detector by detecting a horizontal and vertical signal quantity or by a mechanical vertical direction detector and a memory controller reads out the video signal while controlling the address of the memory so as to correct the slant of the video signal stored in the memory depending on the slant amount, and since the memory is composed of two memory systems the slant may be always corrected for a real time in moving picture, thereby presenting a stable video output.

5 Claims, 9 Drawing Sheets

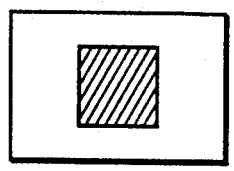
FIG. 11(A)
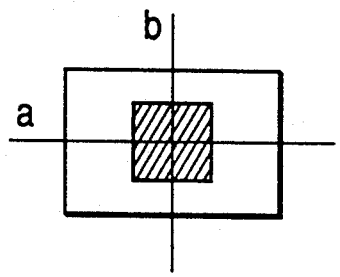
FIG. 11(B)
FIG. 11(B-1)
FIG. 11(B-2)
FIG. 11(C-1)
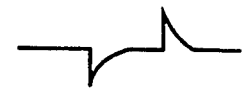
FIG. 11(C-2)
FIG. 11(D-1)
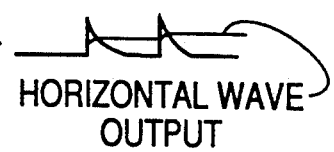
HORIZONTAL WAVE OUTPUT
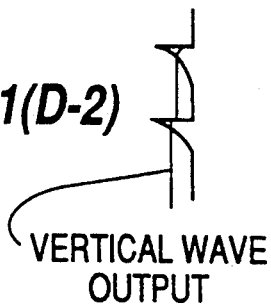
FIG. 11(D-2)
VERTICAL WAVE OUTPUT
FIG. 11(E)
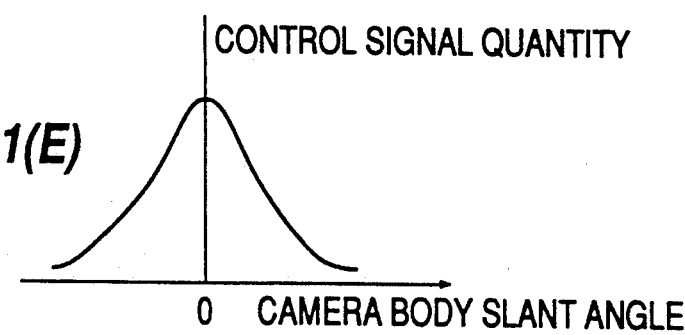
CONTROL SIGNAL QUANTITY
0   CAMERA BODY SLANT ANGLE

IMAGE SLANT COMPENSATABLE VIDEO CAMERA

BACKGROUND OF THE INVENTION

1. Field of the Invention

The present invention relates to an image slant compensatable video camera apparatus for converting an image of an object into a video signal.

2. Description of the Prior Art

In video camera apparatus, recently, camera fluctuation preventive devices have been developed for storing the image information in a memory means, and for delivering the information which has been corrected with respect to camera fluctuations on the basis of the information from the camera fluctuation detecting means. It is, however, impossible to correct the image slant by such camera fluctuation preventive device; the reproduced images are inclined and cannot be appreciated if the user takes pictures while walking. FIG. 9 shows a block diagram of a video camera apparatus in the prior art. In FIG. 9, the incident light entering a camera lens 50 is photoelectrically converted by a photoelectric converter 51, and is delivered to an output terminal 52. In this case, if the conventional video camera apparatus is inclined toward the subject, the subject indicated by arrow which should be vertical as shown in FIG. 10 (A) us delivered in a slanted state. Here, arrow (1) indicates the signal reading direction. Therefore, by recording and reproducing the signal in FIG. 10 (A), the reproduced image is a slant image.

As a method of correcting the image slant, an example is disclosed in Japanese Laid-open Patent Sho. 58-222382. In this method, by the slant signal from a slant detecting means, by controlling the address so as to correct the slant of the image signal stored in the memory means and reading it out, the slant of the output signal is corrected. The method, however, disclosed in JP 58-222382 is limited to still pictures and a general moving picture as in a video camera apparatus could not be corrected for slant.

SUMMARY OF THE INVENTION

It is hence a primary object of the invention to present a video camera apparatus capable of correcting the image slant due to the inclination of the video camera apparatus.

The video camera apparatus of the invention is intended to detect a slant extent with respect to the vertical direction of the entire video camera apparatus by a slant detecting means, and read out the video signal while controlling an address of a memory device by a memory control means so as to correct the slant depending on the slant extent of the video signal stored in the memory device; in which the memory device is composed of two memory means so as to alternately repeat a write mode and a read mode in a specific period to set one in the read mode and the other in the write mode, thereby always correcting the slant in real time with respect to the moving picture to obtain a stable video output.

BRIEF DESCRIPTION OF THE DRAWINGS

FIGS. 11(A)-11(E) are signal waveform diagram for explaining the slant amount detecting method by the signal processing circuit.

DESCRIPTION OF THE PREFERRED EMBODIMENTS

Figure 1:
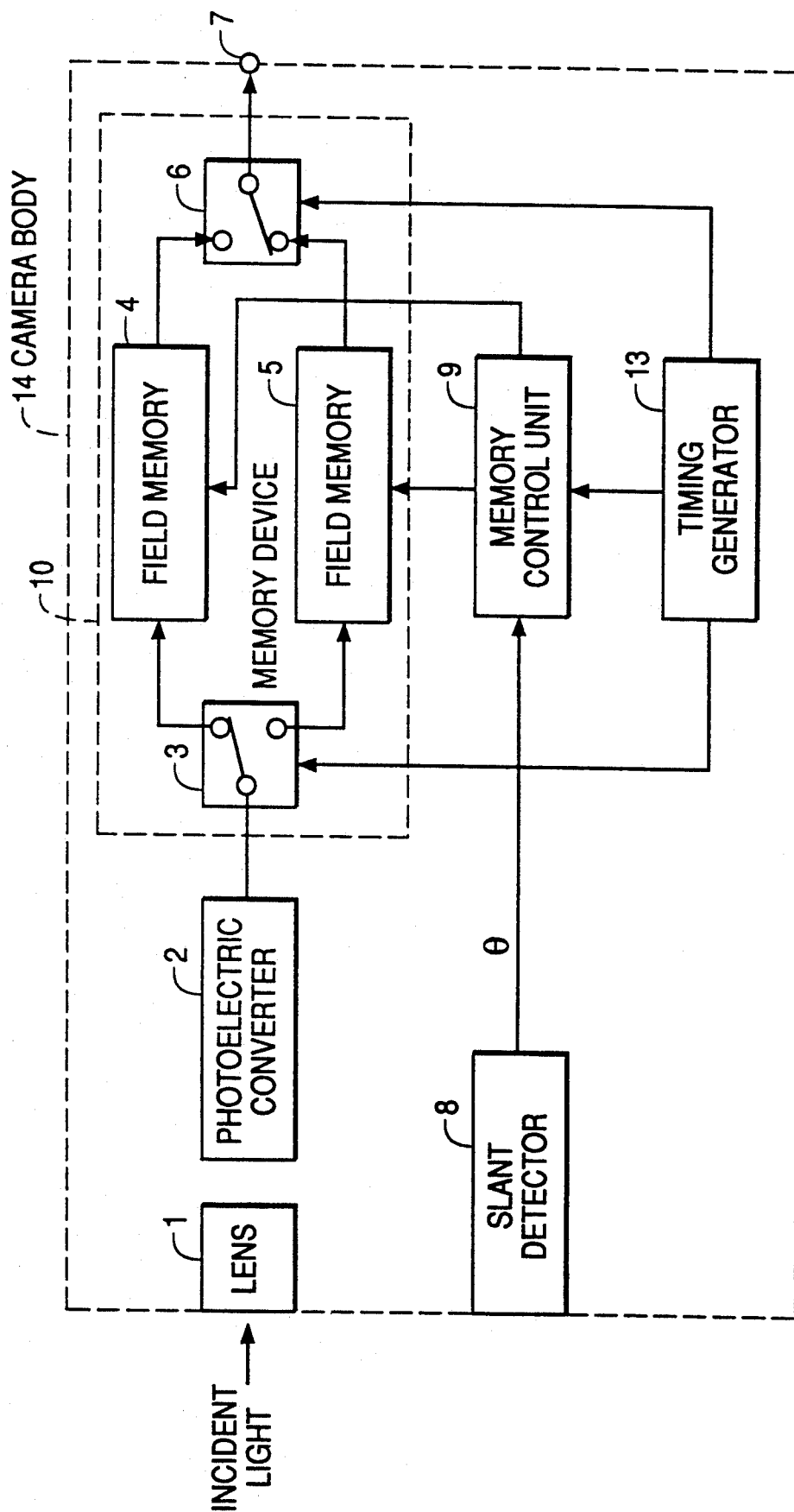
FIG. 1 is a block diagram showing an example of a video camera apparatus in accordance with the present invention.

FIG. 1 is a block diagram showing an embodiment of a video camera apparatus of the invention. The light entering through a camera lens 1 is fed into a photoelectric converter 2 to be photoelectrically converted into a video signal, and is, stored in a memory device 10. The video signal entering the memory device 10 is fed into a first switch 3. The fist switch 3 is switched to the first field memory 4 side in the first field period, and is switched to the second field memory 5 side in the next second field period. The video signal in the first field is stored in the first field memory 4, and the video signal in the second field is stored in the second field memory 5. The video signal stored in the first field memory 4 is read out in the next second field period, and the video signal stored in the second field memory 5 is read out in the next first field period. A second switch 6 operates in the reverse phase of the first switch 3, and is alternately switched to the first field memory 4 and the second field memory 5, thereby delivering a series of video signals to the output terminal 7. Besides, the image slant information detected by a slant detector 8 is fed into a memory control unit 9, and the memory control unit 9 controls the read action of the first field memory 4 and second field memory 5 of the memory device 10 depending on the slant information, and delivers signals so as to correct the slant of the output moving picture signals in real time.

Figure 3:
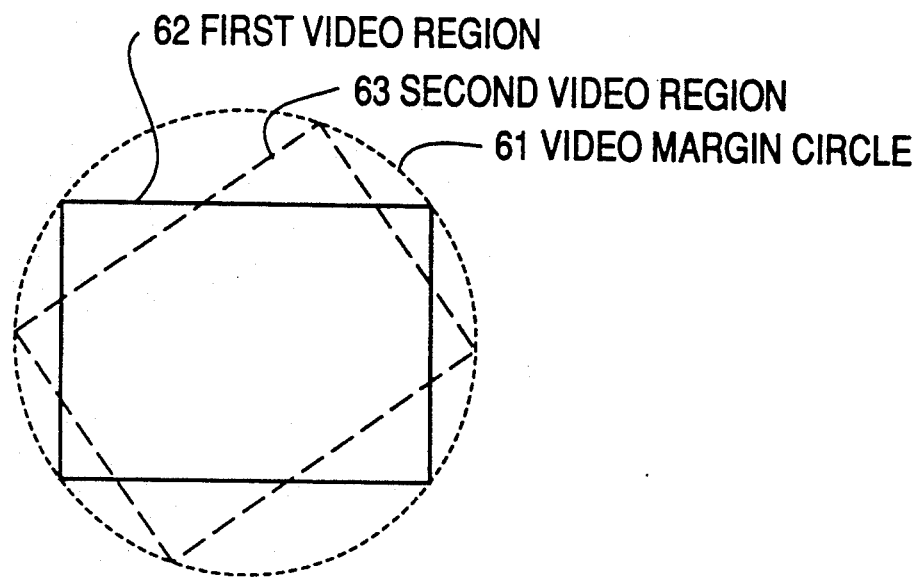
FIG. 3 is a diagram showing the video signal range handled by the video camera apparatus of the present invention.

FIG. 3 shows a video signal range stored in the memory device 10 by the output signal from the photoelectric converter 2. In FIG. 3, all signals corresponding to the video margin circle 61 are stored in the memory device 10. The video margin circle 61 is a circle circumscribing both a first video range 62 when the video camera is not inclined and a second image range 63 when the video camera is inclined, or having a larger diameter.

Figure 4:
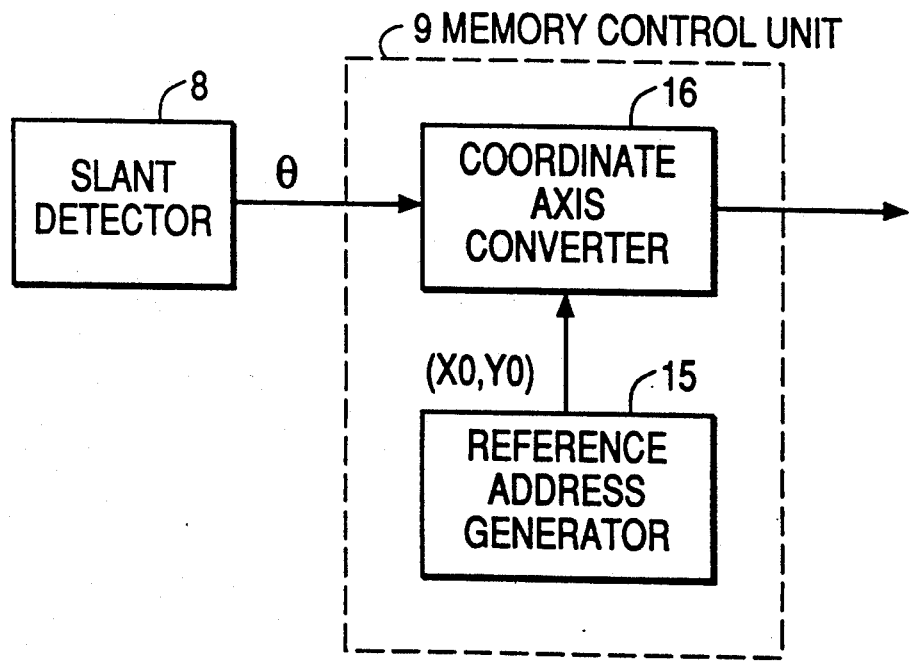
FIG. 4 is a block diagram showing an example of a memory control device of video camera apparatus of the present invention.

FIG. 4 shows the constitution of the memory control unit 9. The memory control unit comprises a reference address generating part 15 and coordinate axis converting part 16. The slant information θ(the slant angle in the vertical direction) of the video camera apparatus delivered from the slant detector 8 is fed into the coordinate axis converter 16. From the reference address generator 15, the address to be input to the memory device 10 when the slant information θ is 0 is fed into the coordinate axis convertor part 16. Suppose the address (X0, Y0) is input from the reference address generating part. At this time, in the coordinate axis converter 16, for example, the coordinate conversion is calculated as $$X1 = X0 \times COS\theta + Y0 \times SIN\theta$$

$$Y1 = XO \times SIN\theta + Y0 \times COS\theta$$

and a new address (X1, Y1) is obtained. According to this new address, when the signal is read out from the memory device 10, a corrected video signal is obtained. The coordinate conversion calculation in the coordinate axis converter 16 may be realized, for example, by the program of a microcomputer. The action timings of the first switch 3, second switch 6 and memory control unit 9 are determined by the field signal generated by a timing generator 13.

Figure 10A:
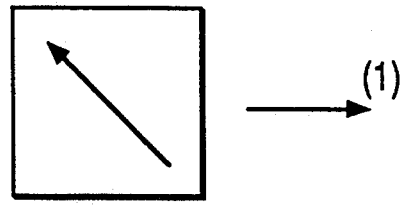
FIGS. 10(A)-10(C) are schematic diagrams showing the slant correction action.
Figure 10B:
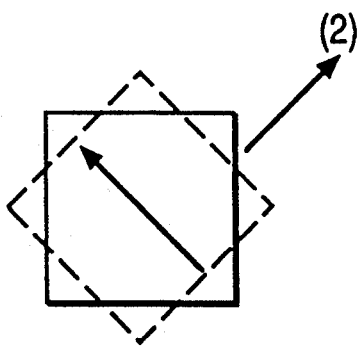
Figure 10C:
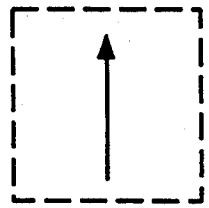

FIGS. 10(A)–10(C) a concept of the slant correction action. When the camera device itself is inclined, in the conventional method, the camera device output signal is also inclined as shown in FIG. 10(A).

Figure 5:
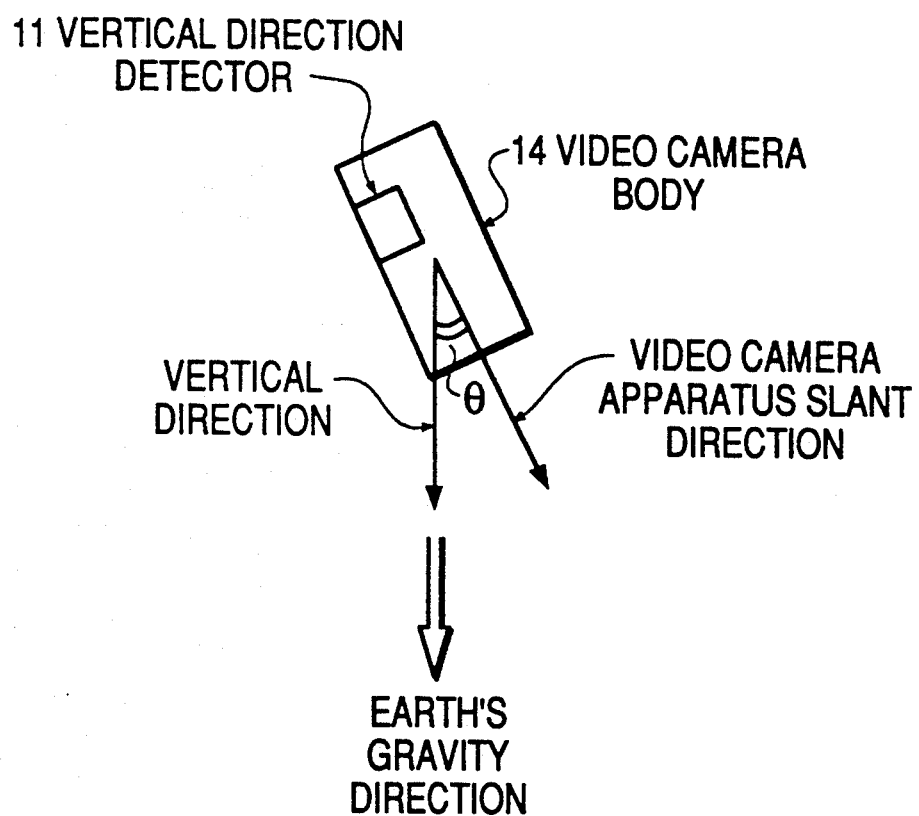
FIG. 5 is a vector diagram for explaining the mechanical slant amount detecting method in the vertical direction of the video camera apparatus of the present invention.

Accordingly, the image in FIG. 10 (A) is once stored in the memory device 10, and according to the slant information delivered from the slant detector 8, it is controlled and read out by the memory control unit 9. In other words, as shown in FIG. 10(B), supposing the arrow (2) to be the reading direction which has been slant corrected, by reading out the video signal in the direction of (2) from the memory device 10, a normal signal without slant is obtained as the output signal from the camera device as shown in FIG. 10 (C). As the slant detecting means 8, for example, a vertical direction detector 11 is used. As the vertical direction detector 11, a gyromechanism or a mechanical vertical direction detecting means is used. For example, as shown in FIG. 5, when the video camera main body 14 is seen from the front, if the inclination of the camera body at an angle of θ to the vertical direction, that is, in the direction of the gravity of the earth is detected by the vertical direction detector 11, the reading of the video signal from the memory device 10 is controlled so as to correct the slant θ. The vertical direction detector 11 is fixed to the camera body.

Figure 7:
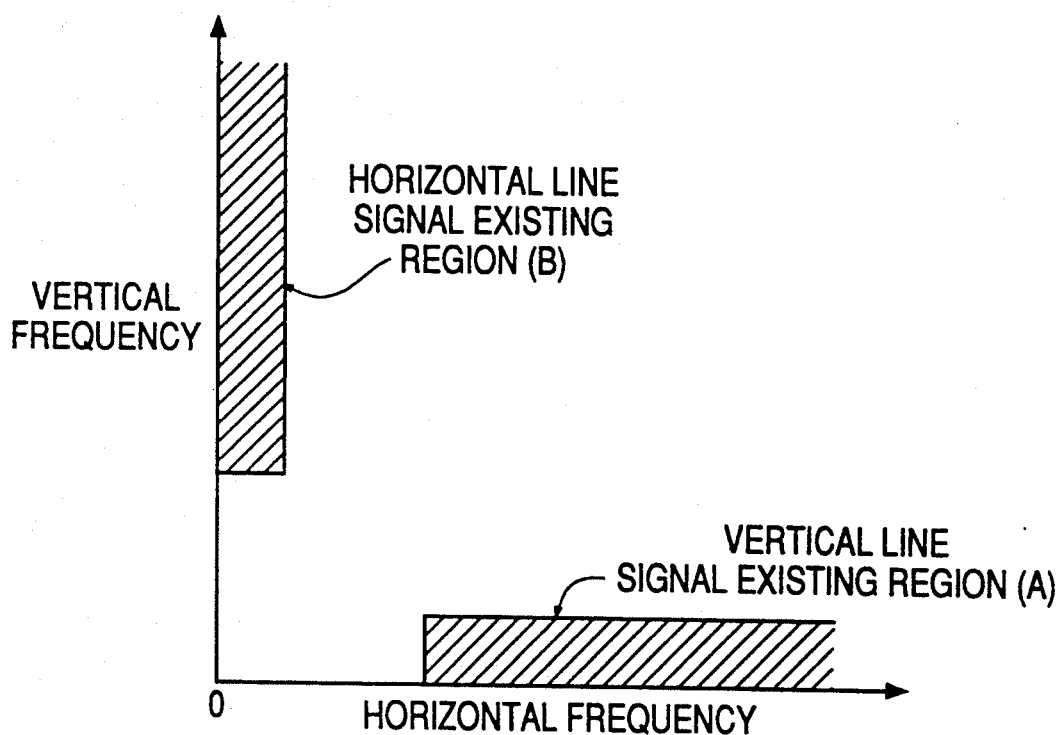
FIG. 7 is a slant information distribution diagram on two-dimensional frequency axis for the slant amount detecting method by the signal processing circuit.

FIG. 7 is a two-dimensional frequency characteristic diagram showing the existing region of the horizontal line signal and vertical line signal. The vertical line signal existing region (the vertically shaded area in screen) is the region (A), and the horizontal line existing region (the horizontally shaded area in screen) is the region (B). When the camera body is not inclined, by nature, the horizontal line components and vertical line components are maximum, which may be utilized as the evaluation value of the slant amount.

Figure 2:
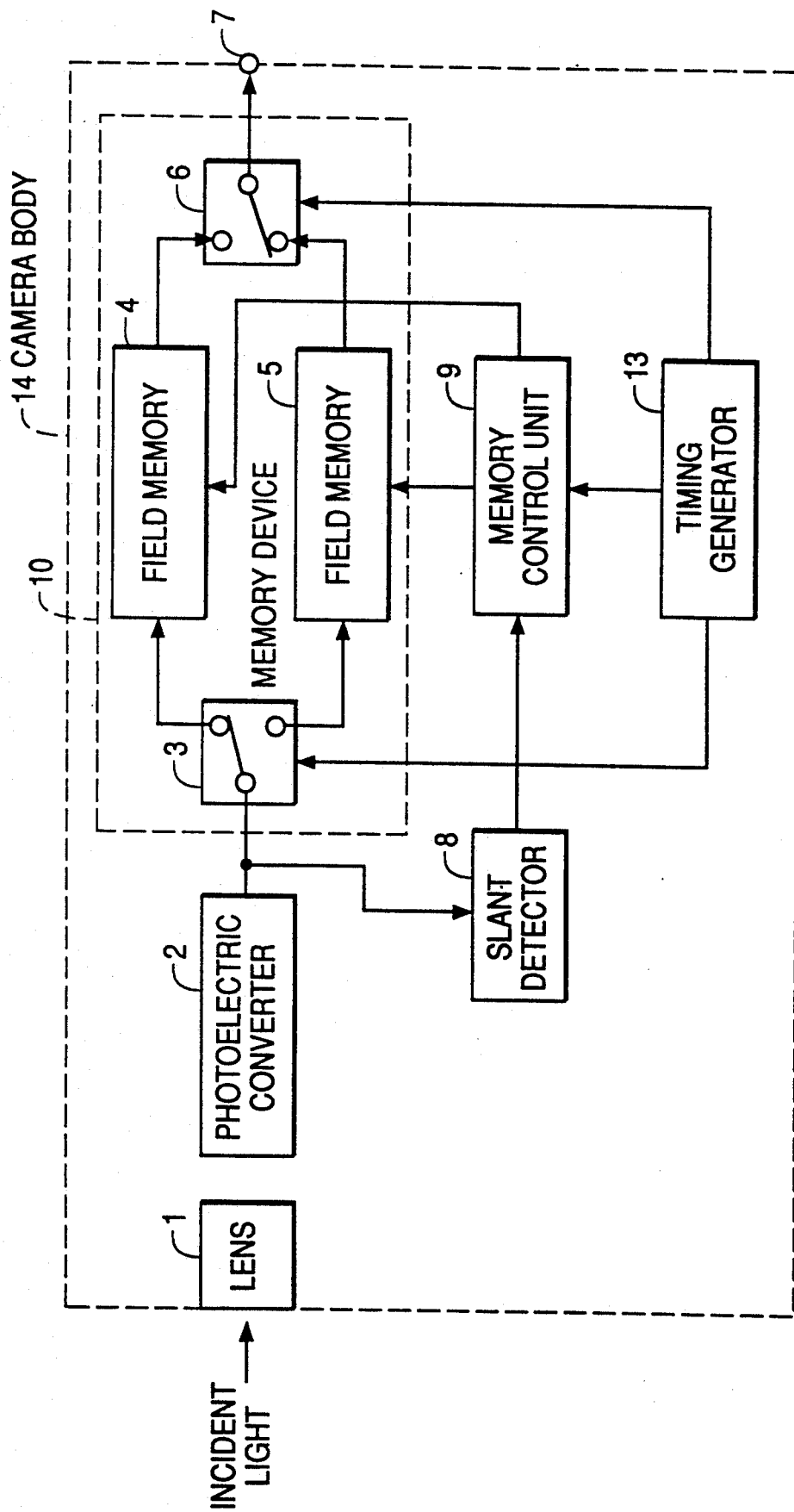
FIG. 2 is a block diagram showing another example of a video camera apparatus in accordance with the present invention.
Figure 6:
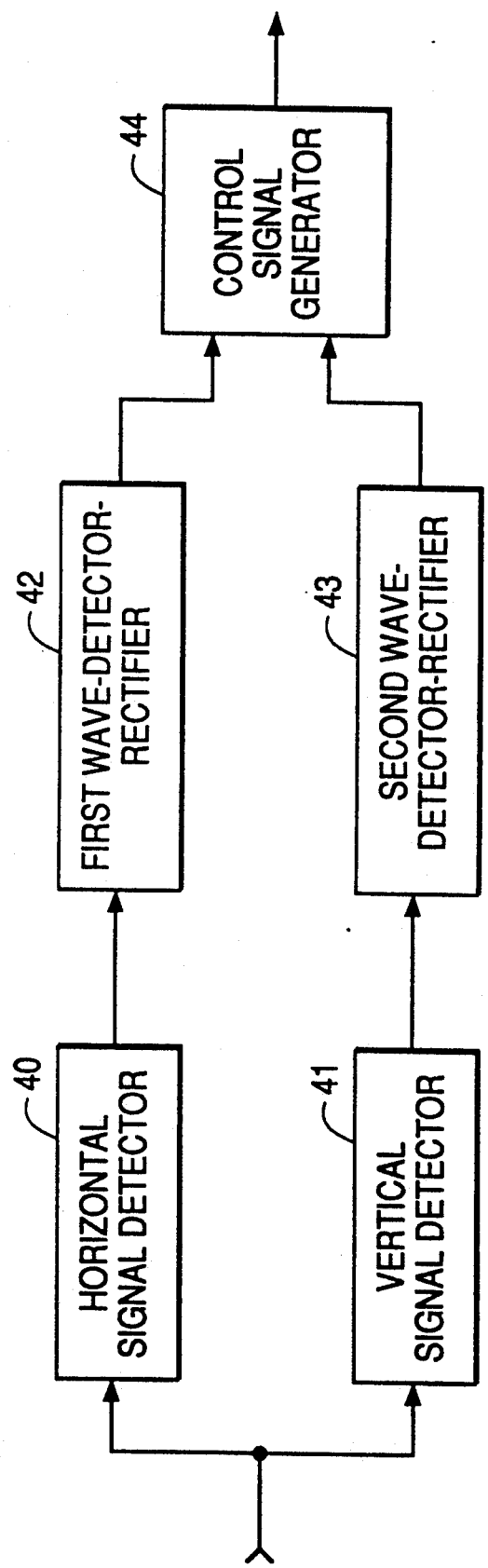
FIG. 6 is a block diagram for explaining the vertical direction detecting method in a signal processing circuit in a video camera apparatus of the present invention.

FIG. 2 is a block diagram showing another embodiment of the video camera apparatus in accordance with the present invention. That is, as the input information to the slant detecting means 8, the output signal of the photoelectric converter 2 is used. The slant detector 8 of the video camera in FIG. 2 is composed, for example, as shown in FIG. 6. As shown in FIG. 6, there are disposed a horizontal signal detector 40, a vertical signal detector 41, a first rectifier 42, a second rectifier 43, and a control signal generator 44. FIGS. 11(A)–11(E) show the signal waveforms of parts of the slant detector 8 shown in FIG. 6. For example, an input signal is assumed to be a signal lowered in the video signal level in a window shape in the middle as shown in FIG. 11 (A). As shown in FIG. 11(B), the signal level change in a horizontal line a is as shown in FIG. 11(B-2). The signal level change in vertical line b is as in (B-2). The horizontal signal detector 40 selects the vertical line signal components of the input signal, and delivers the signal as in shown in FIG. 11(C-1). Furthermore, the horizontal signal quantity is detected by the first rectifier 42, and the vertical detection output is delivered to the control signal generator 44 as shown in FIG. 11(D-1). The vertical signal detector 41 selects the vertical signal components of the input signal, and delivers the signal as shown in FIG. 11(C-2). Furthermore, the vertical signal quantity is detected by the second rectifier 43, and the signal as shown in FIG. 11(D-2) is delivered to the control signal generator 44. In the control signal generator 44, the slant information is delivered so that either the horizontal signal or the vertical signal, or both the horizontal signal and the vertical signal may be maximum. For example, the output signals of the first rectifier 42 and the second rectifier 43 are summed up. The output signal quantity of the control signal generator 44 is as shown in FIG. 11(E). In FIG. 11(E), the abscissa axis denotes the camera body slant angle, and the ordinate axis indicates the control signal quantity. Since the control signal quantity becomes the maximum at the camera body slant of 0, the address of the memory device 10 is controlled so as to maximize the control signal quantity.

Figure 12A:
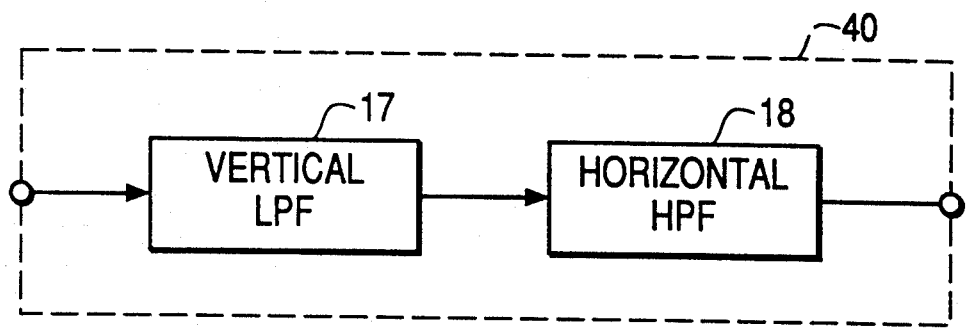
FIGS. 12(A)-12(B) are block diagrams showing an example of constitution of a horizontal signal detector and a vertical signal detector in the slant amount detecting method of the signal processing circuit.
Figure 12B:
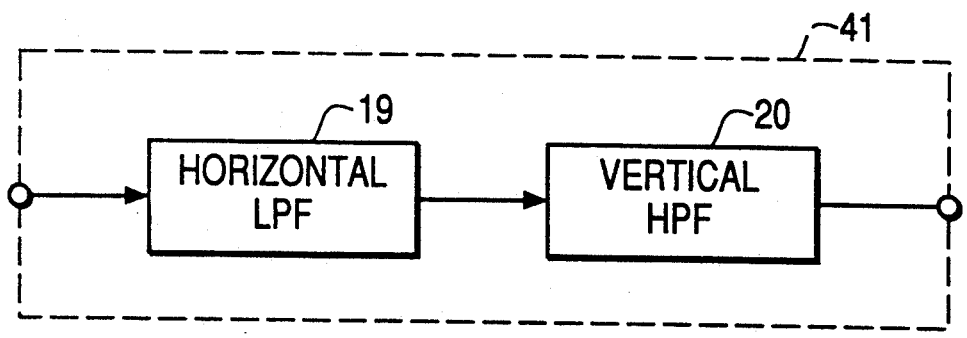

FIG. 12 (A) is a block diagram showing an embodiment of horizontal signal detector 40, and FIG. 12(B) shows the vertical signal detector 41. In FIG. 12(A) the signal fed into the horizontal signal detector 40 is passed through the horizontal high pass filter 18 after being passed through the vertical low pass filter 17, so that the vertical line components of the video signal are extracted. In FIG. 2(B), the signal entering the horizontal signal detector 40 is passed through the vertical high pass filter 20 after being passed the horizontal low pass filter 19, so that the horizontal line components of the video signal may be extracted. According to this method, the slant amount can be detected by the signal processing alone, and an external sensor is not necessary.

Figure 8:
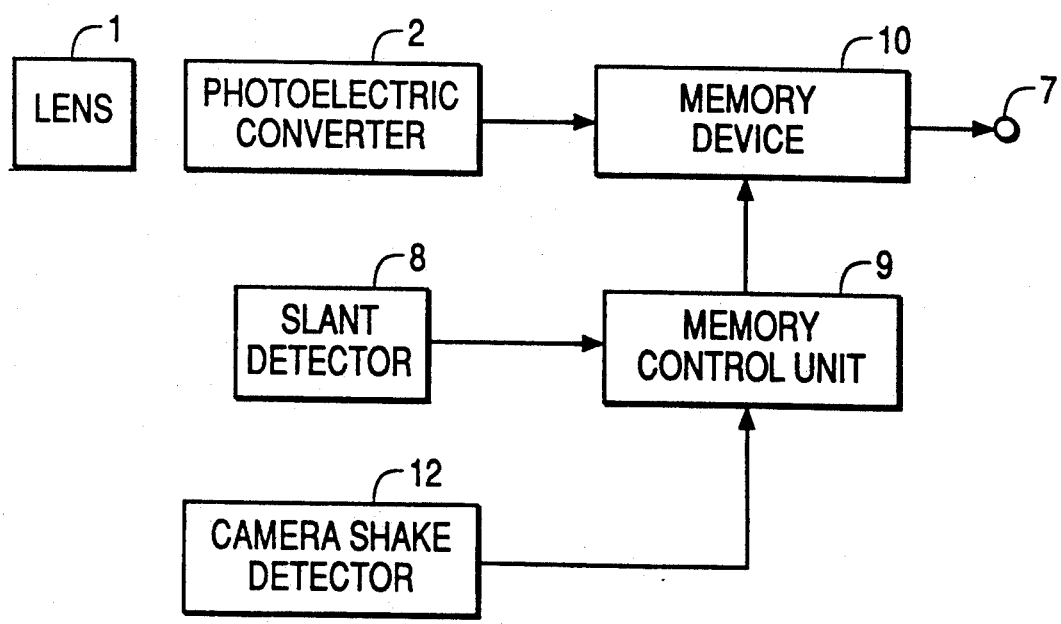
FIG. 8 is a block diagram showing the shared use of the video camera apparatus and camera shake preventive device of the present invention.
Figure 9:
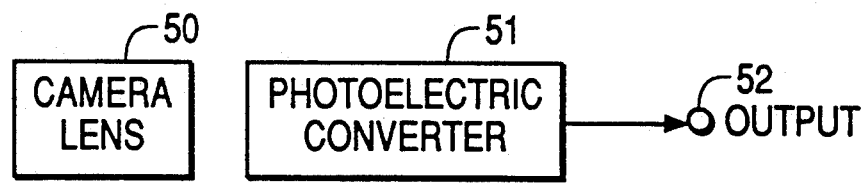
FIG. 9 is a block diagram showing a conventional video camera apparatus.

FIG. 8 shows a block diagram when combined with the camera fluctuation detecting means 12. As shown in FIG. 8, by sharing the memory device control means 9 and the subsequent devices, camera fluctuation prevention and slant correction may be realized by a compact configuration. The detector 12 shown in FIG. 8 may be easily realized by employing the conventional camera shake preventive technology, for example, as disclosed in the Japanese Laid-open Patent Hei. 1-125064.

Besides, in either FIG. 1 or FIG. 2, an A/D converting means may be used after the photoelectric converter 2, and the subsequent system may be realized by digital signal processing.

What is claimed is:

1. A video camera apparatus comprising:

an imaging means converting an image of an object formed by light from the object to a video signal;

a memory means having two memories each changing its operating mode at predetermined intervals between a write mode in which the video signal is written into the memory and read mode in which the video signal written in the memory is read out, each of the two memories being in one of the write mode and the read mode when the other of the two memories is in the other of the write mode and the read mode;

a slant detecting means for detecting a positional slant of the image and producing a slant detection signal indicative of the detected positional slant, said slant detecting means comprising a first detecting means for detecting a quantity of a horizontal signal component of the video signal, a second detecting means for detecting a quantity of a vertical signal component of the video signal, and a slant signal producing means for producing from output signals of the first and second detecting means the slant detection signal whose quantity corresponds to at least one of the quantity of the horizontal signal component and the quantity of the vertical signal component; and a memory control means responsive to the slant detection signal for controlling a read operation of each of the two memories in the read mode so as to compensate for the positional slant of the image.

2. A video camera according to claim 1, wherein the memory control means controls the read operation of each of the two memories so that at least one of the quantity of the horizontal signal component and the quantity of the vertical signal component becomes a maximum.

3. A video camera according to claim 1, wherein the first detecting means comprises a means for detecting a horizontal signal component from the video signal, and a first rectifying means for rectifying the detected horizontal signal component, and wherein the second detecting mans comprises a means for detecting a vertical signal component from the video signal, and a second rectifying means for rectifying the detected vertical signal component.

4. A video camera according to claim 1, wherein the slant signal producing means adds the output signals of the first and second detecting means to obtain the slant detection signal.

5. A video camera according to claim 1, wherein each of the two memories comprises a field memory which changes the write mode and the read mode at vertical scanning intervals of the video signal.

* * * * *